United States Patent [19]

Garza

[11] 4,092,828
[45] June 6, 1978

[54] HYDROELECTRIC PLANT

[76] Inventor: Roberto M. Garza, P.O. Box 7036, San Antonio, Tex. 78207

[21] Appl. No.: 816,462

[22] Filed: Jul. 18, 1977

Related U.S. Application Data

[63] Continuation-in-part of Ser. No. 684,796, May 10, 1976, abandoned.

[51] Int. Cl.² ............................................. F03B 13/12
[52] U.S. Cl. .................................... 60/506; 60/398; 417/332; 60/500; 60/505
[58] Field of Search ................................ 60/497–507, 60/398; 417/331, 332; 290/53

[56] References Cited

U.S. PATENT DOCUMENTS

| | | | |
|---|---|---|---|
| 3,918,261 | 11/1975 | Bailey | 60/506 |
| 3,974,652 | 8/1976 | Lovmark | 60/506 X |

*Primary Examiner*—Allen M. Ostrager
*Attorney, Agent, or Firm*—Gunn & Lee

[57] ABSTRACT

A hydroelectric plant operated by wave action is supported by the ocean floor and extends above the surface of the ocean. Connected to an outer edge of the plant structure above the surface of the ocean is a plurality of pivotally connected lever arms having floats connected on the ends thereof. The floats rise and fall with the ocean waves to cause pivotal motion of the lever arms. The lever arms connect through an adjustable crosshead and hydraulic cylinder to secondary levers. The secondary levers are pivotally attached to the plant structure and operate pump rods to move pistons the same stroke length regardless of the tide or the height of the waves. The movement of the piston may be used to pump water through a turbine, or to pressurize air, either of which may be used as a driving force for generating power.

10 Claims, 11 Drawing Figures

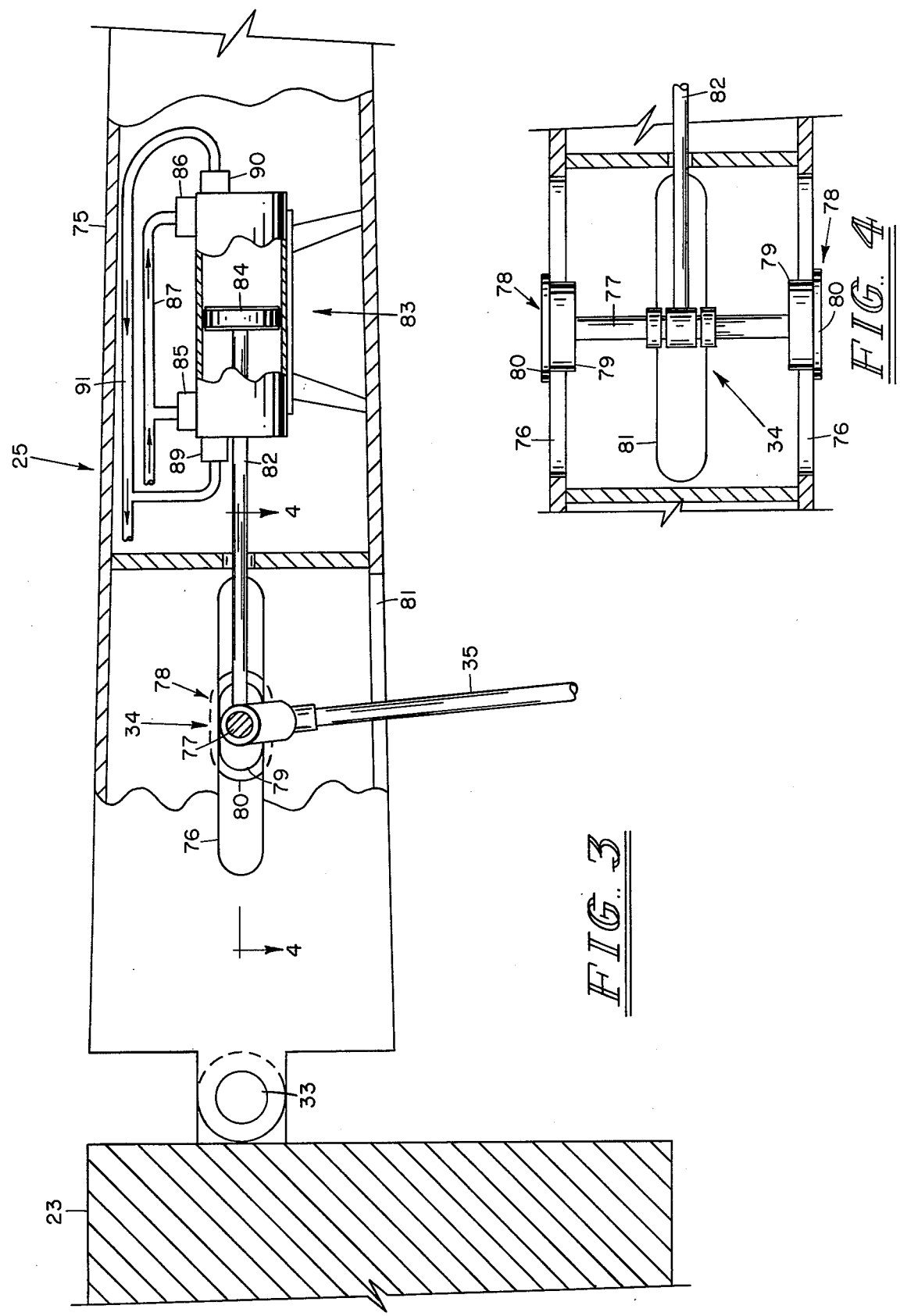

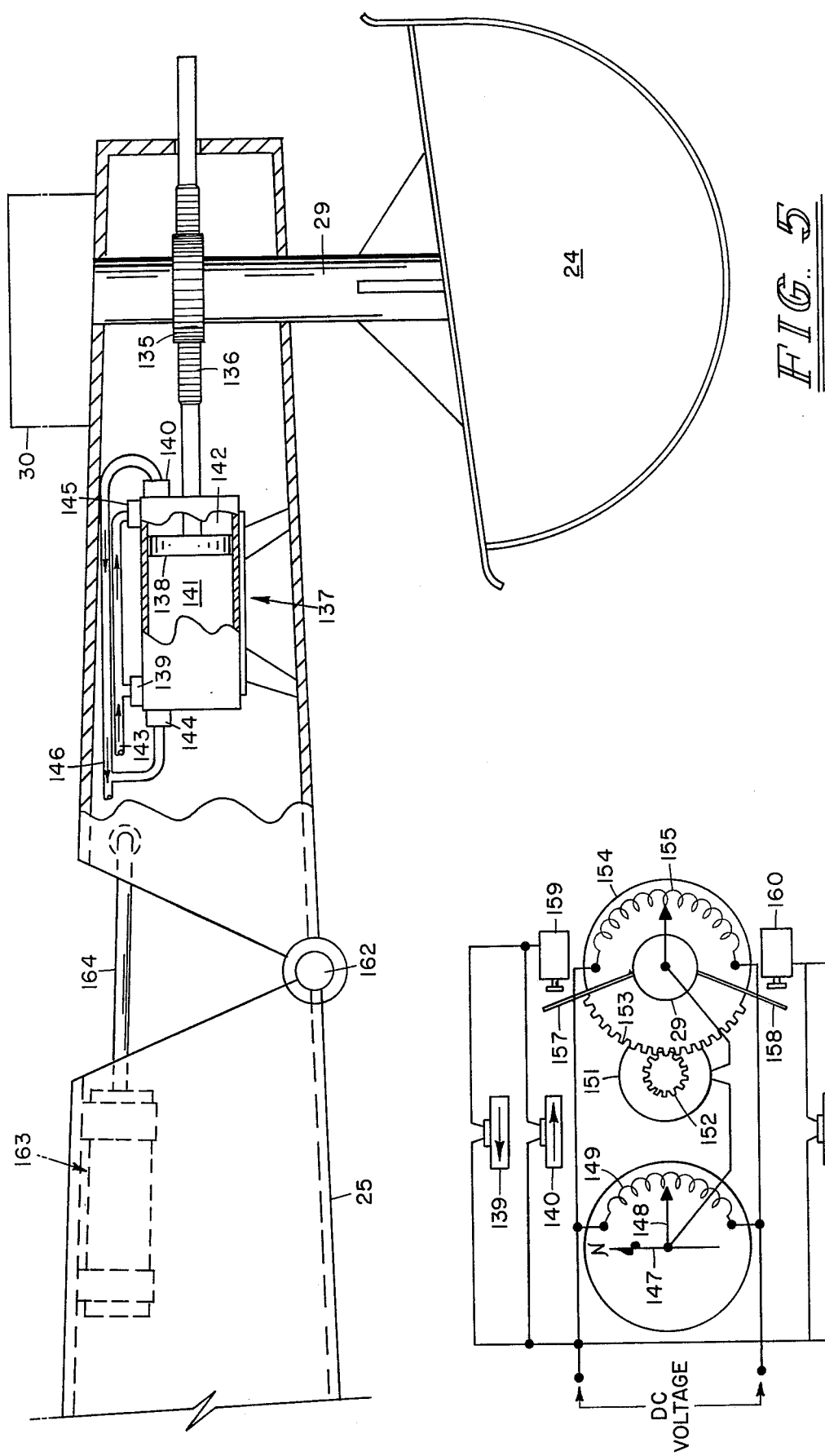

HYDROELECTRIC PLANT

This patent application is a continuation-in-part of U.S. patent application Ser. No. 684,796 filed on May 10, 1976 and having the same inventor as the present application. The aforesaid patent application Ser. No. 684,796 is expressly abandoned upon the filing of this application.

BACKGROUND OF THE INVENTION

The present invention relates to a hydroelectric plant and, more particularly, to a wave actuated hydroelectric plant having a plurality of constant displacement pistons that are responsive to floats pivotally attached to a stationary structure wherein each individual piston will displace the same volume during each stroke.

BRIEF DESCRIPTION OF THE PRIOR ART

Prior to the present invention, many different types of wave actuated devices have been devised and patented in the past. Some of the prior devices included underwater pistons anchored to the ocean floor. The piston normally had a piston rod extending upward from a suitable cylinder to a float located at the surface of the ocean. As the float would move up and down in response to wave action, the piston, by use of appropriate inlet and outlet check valves, would pump the ocean water therethrough into a conduit. The ocean water flowing through the conduit could then be used as a source of power. However, the stroke length of the piston in these prior devices was directly proportional to the height of the individual waves. As the height increased, the stroke length increased; and as the height decreased, the stroke length would correspondingly decrease. Therefore, the volume of flow generated by each piston would vary greatly depending upon the height of the waves. The height of an individual wave is normally dependent upon the velocity of the wind at the ocean surface. A typical such device is shown in U.S. Pat. No. 3,970,415 issued to Widecrantz.

The use of waves to generate power has been known for a considerable length of time with a complicated device for using wave power being patented in 1892 by Rosenholz as U.S. Pat. No. 472,398. Many other devices have likewise been patented that operate either from wave action or the movement of the tide. However, a problem that was common with all of the prior devices involved the variation in the stroke length of the fluid mover, such as a piston, which variation was directly related to the height of the waves or tide action.

In attempts to combat the variation in stroke length caused by the varying height of the waves, many prior inventions were located inside of areas protected by sea walls or within coves or inlets that would not receive the full effect of the ocean waves. Inside of these relatively protected areas, a limited amount of wave or tide action would reach the actuation device, such as a float. The limiting of the size of the wave or tide action also limits the force that can be exerted on the actuation device.

SUMMARY OF THE INVENTION

It is an object of the present invention to provide a hydroelectric plant operating from wave action to generate power.

It is another object of the present invention to have a hydroelectric plant with a plant structure having pivotally mounted lever arms extending downward to the ocean surface with floats mounted on the end thereof for floating along the ocean surface.

It is yet another object of the present invention to provide a constant displacement piston operated by floats at the surface of the ocean with the stroke length of the piston remaining constant despite the wave height and tidal action.

The present invention includes a plant structure that may be stationary on the ocean floor with a portion of the plant structure extending above the surface of the ocean. Extending downward from the plant structure are pivotally mounted lever arms with floats located on the ends thereof. The floats will rise and fall due to wave action and cause the lever arms to pivot. The pivotal movement of the lever arms is transmitted through a crosshead and a hydraulic cylinder to a secondary lever. Adjustment along the crosshead varies the pivotal connection between the lever arm and the secondary lever in response to changes in the height of the ocean waves. Therefore, pivotal movement of the secondary lever in response to wave action remains constant due to the positioning along the crosshead of the interconnection between the lever arm and the secondary lever despite the height of the waves. The hydraulic cylinder either expands or contracts in response to tidal action to again maintain the stroke length of the piston regardless of the tide. By use of proper solenoid controls, hydraulic cylinders position and locate the crosshead along the lever arm. Likewise, servocontrols regulate the operation of the hydraulic cylinder connected between the secondary lever and the lever arm in response to the height of the tide.

By the use of a suitable underwater float, the weight of a piston rod extending to a piston located below the surface of the ocean is counterbalanced. By using check valves, the action of the float will move the piston up and down and cause fluid flow therethrough. A plurality of such pistons causes fluid flow through a turbine thereby causing the turbine to turn. Turning of the turbine will operate an electric generator for the generation of power. Also, by the use of appropriate servocontrols and hydraulic cylinders, the floating devices may be continually positioned to receive the full effect of the wave action. A wind directional vane supplies the control signal for positioning the floating devices.

While the preferred embodiment shows the hydroelectric plant as operating a turbine due to water flow therethrough, the wave action may also operate a piston that would pressurize a gas, such as the atmosphere. The pressurized gas could then be used as the driving force for generating power.

BRIEF DESCRIPTION OF THE DRAWINGS

FIG. 3 is an enlarged partial cross-sectional view of the lever arm shown in FIGS. 1 and 2.

FIG. 4 is a cross-sectional view of FIG. 3 taken along section lines 4—4.

FIG. 5 is an enlarged partial cross-sectional view of the end of one of the lever arms shown in FIGS. 1 and 2.

FIG. 6 is a schematic illustration of a servocontrol and may be used for adjusting the position of the float shown in FIG. 5.

DESCRIPTION OF THE PREFERRED EMBODIMENT

Figure 1:
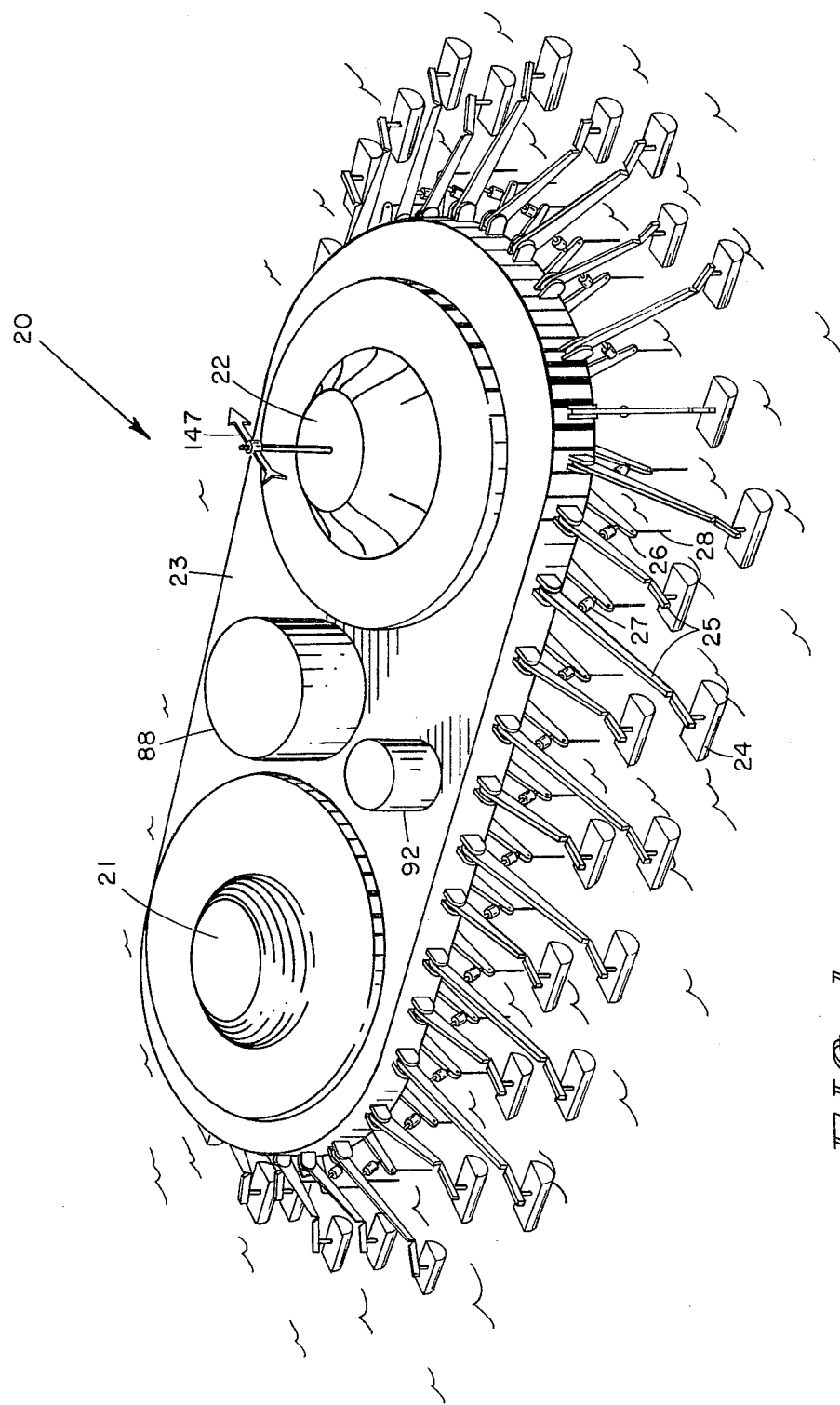
FIG. 1 is a perspective view of a hydroelectric plant embodying the present invention.

Referring to FIG. 1 of the drawings, there is pictorially shown a hydroelectric plant represented generally by the reference numeral 20. The hydroelectric plant 20 has first and second turbine sections 21 and 22, respectively. The first and second turbine sections 21 and 22 are located on and within plant structure 23. A plurality of floats 24 are connected through lever arms 25 to the plant structure 23. The lever arms 25 operate secondary levers 26 through interconnecting hydraulic cylinders 27 as will be explained in more detail subsequently. The secondary levers 26 connect through piston rods 28 to pistons located below the ocean surface.

Figure 2:
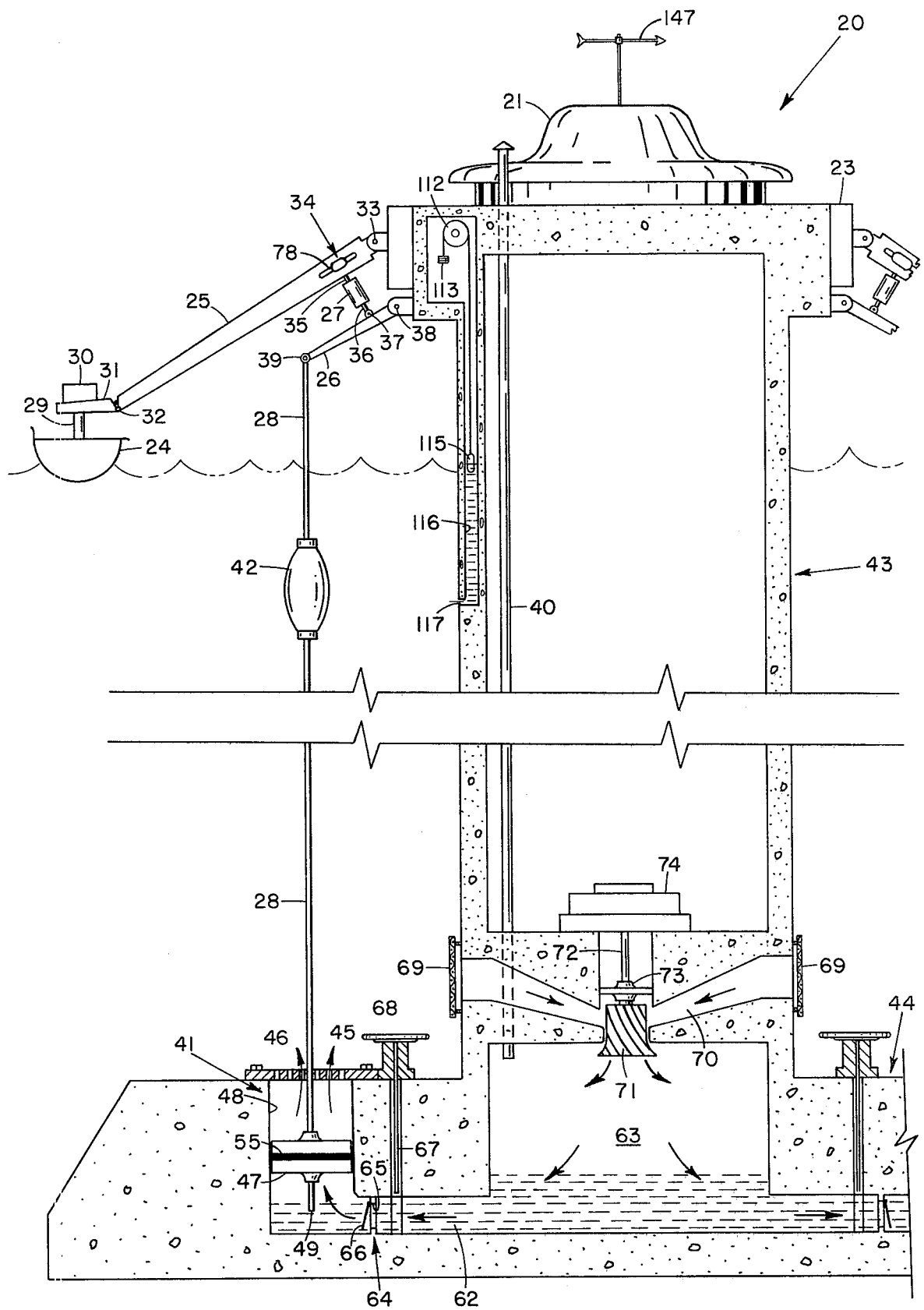
FIG. 2 is an elevated cross-sectional view of FIG. 1.

Referring now to FIG. 2 of the drawings, there is shown a cross-sectional view of the hydroelectric plant 20 and the first turbine section 21. The lever arm 25 has a float 24 connected through a vertical shaft 29 to a float control 30 located on horizontal lever 31. The horizontal lever 31 connects to lever arm 25 through pivot pin 32 with the horizontal lever 31 being periodically adjusted in response to tidal action to maintain vertical shaft 29 in approximately the vertical position as will be subsequently described.

The upper end of lever arm 25 is pivotally connected to a plant structure 23 through pivot pin 33. Also located along the upper portion of the lever arm 25 is an interconnecting crosshead 34 connected to hydraulic cylinder 27 through crosshead rod 35. The opposite end of the hydraulic cylinder 27 is pivotally connected through cylinder shaft 36 and pin 37 to secondary lever 26.

The secondary lever 26 is pivotally connected to the plant structure 23 by means of pivot pin 38. The opposite end of secondary lever 26 is connected through pivot pin 39 to piston rod 28. Piston rod 28 extends downward to the bottom of the ocean floor to a hydraulic cylinder represented generally by reference numeral 41. If the distance to the hydraulic cylinder 41 is considerable, it may be necessary to have a ballast float 42 along the piston rod 28.

The plant structure 23 includes a center section extending below the surface of the ocean to the lower section 44 located on the ocean floor. Within the lower section 44 are located the hydraulic cylinders 41. Each of the hydraulic cylinders 41 has a cover plate 45 with discharge holes 46 extending therethrough. The piston rod 28 extends through the cover plate 45 to connect to piston 47 located inside of cylinder 48. The bottom 49 of piston rod 28 will provide a positive limit to the downward movement of piston 47 if necessary.

Figure 8:
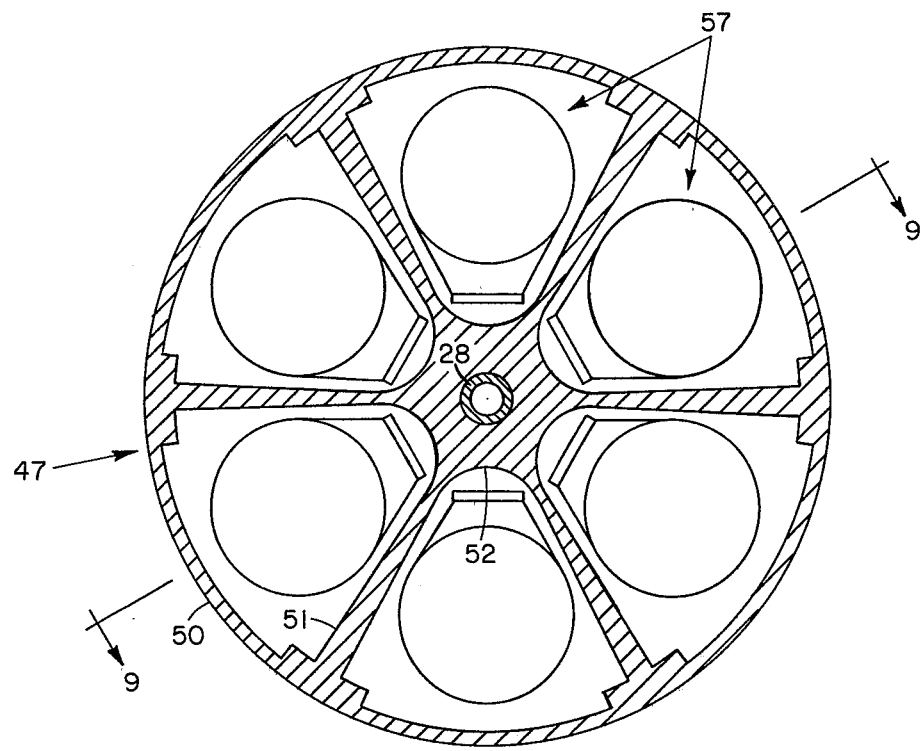
FIG. 8 is a sectional view of the piston.
Figure 9:
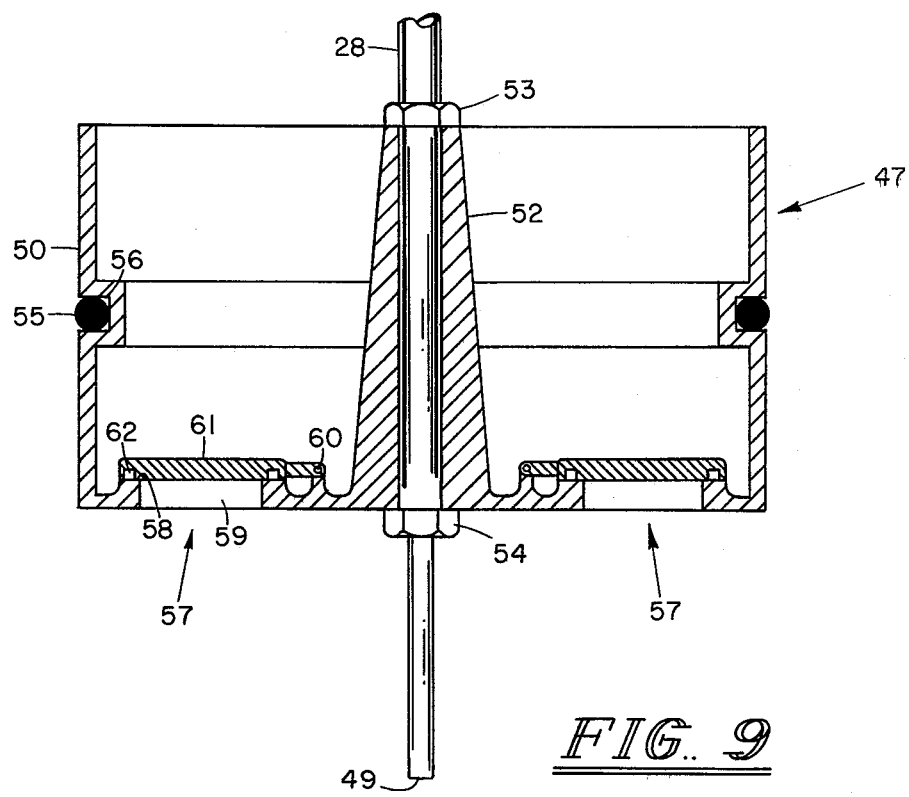
FIG. 9 is a cross-sectional view of FIG. 8 along section lines 9—9.

Referring now to FIGS. 8 and 9, the piston 47 is shown in more detail. The piston 47 includes an outer cylinder 50 with a plurality of radially inward extending veins 51. The veins 51 terminate at a center section 52 which has the piston rod 28 extending therethrough.

The piston rod 28 is connected to the center section 52 by any suitable means, such as a crosspin or welding. For the purposes of illustration, FIG. 9 shows the piston 47 connected to piston rod 40 by means of an upper threaded nut 53 and a lower threaded nut 54. Any number of seal rings may be located around the outer cylinder 50, but for the purposes of illustration, only seal ring 55 is shown in seal ring groove 56.

Located between each of the veins 51 are check valves 57. The check valves 57 include a raised boss seat 58 surrounding opening 59 in the bottom thereof. Pivotally connected about hinge pin 60 and adjacent to opening 59 is a clapper 61 for check valve 57. Located in the face of the clapper 61 is an O-ring seal 62 for sealing against the raised boss seat 58. As the piston 47 moves downward inside of cylinder 48, the fluid acting against the face of the clapper 61 will cause the clapper 61 to pivot about hinge pin 60 to allow fluid flow through opening 59. As the piston 47 moves upward, the clapper 61 will close and seal against raised boss seat 58 thereby forcing fluid out of the discharge holes 46.

Referring back to FIG. 2, a passage 62 connects the cylinder 48 with a central cavity 63 of the hydroelectric plant 20. Located in the passage 62 is a check valve 64 having a suitable valve seat 65 and clapper 66 so that fluid will only flow in the direction indicated by the arrows. As a safety precaution, a gate valve 67 that may be operated by hand crank 68 or any other suitable means may be used to close passage 62 and prevent further pumping by piston 47. As the fluid passes through piston 47 and out discharge holes 46, additional fluid will flow into cylinder 48 through passage 62. The hydrostatic head located around the center section 43 will cause the ocean water to flow through screen 69 and passages 70 to turbine 71. Thereafter, the ocean water will flow through turbine 71 into central cavity 63 prior to being drawn through passage 62 by the piston 47.

A conduit 40 which extends from above the first turbine section 21 to the central cavity 63 located therein prevents a vacuum from forming in central cavity 63 so that the flow of ocean water through passages 70 will be caused by the hydrostatic head.

The flow of ocean water over turbine 71 will cause the turbine 71 to turn. The turbine 71 is connected by means of a drive shaft 72 extending through bearing housing 73 to generator 74. While drive shaft 72 is shown connecting to a pictorially illustrated generator 74, drive shaft 72 may be used for generating any convenient and economical source of power.

Figure 10:
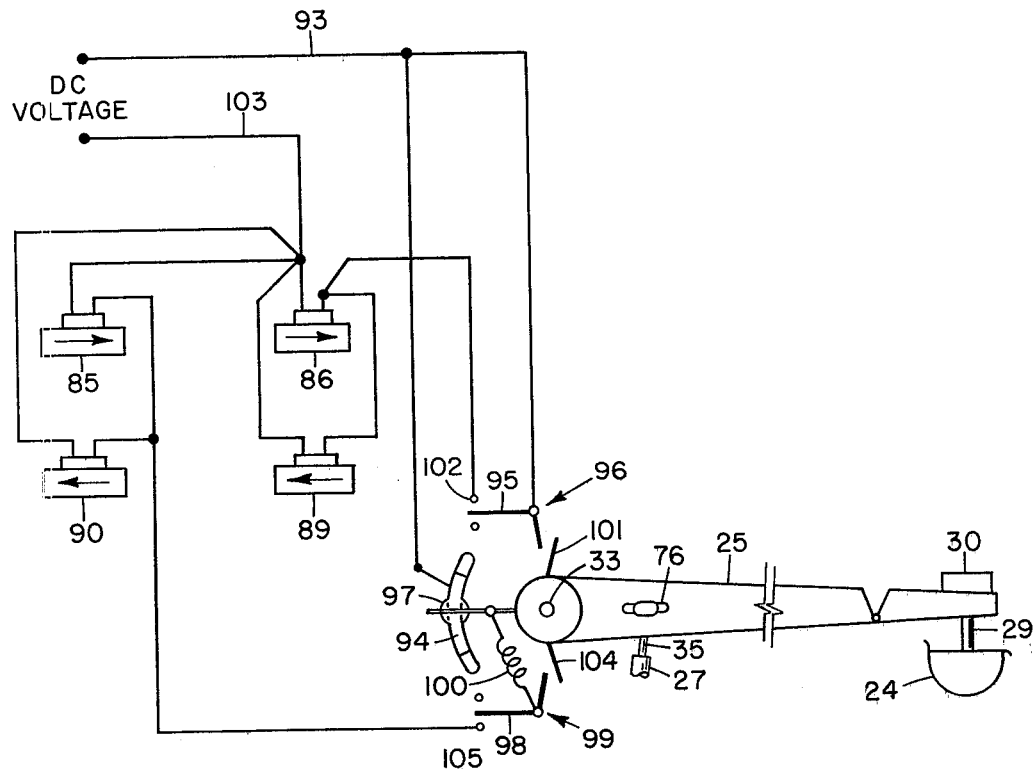
FIG. 10 is a schematic representation of the control portion to adjust the crosshead connection with the lever arm in response to the wave action.

Referring now to FIG. 3 of the drawings, there is shown a partial cross-sectional view of one of the lever arms 25. Referring to FIG. 3 in conjunction with the upper sectional view of FIG. 4 taken along section lines 4—4 of FIG. 3, and the schematic representation as shown in FIG. 10, a better understanding of the crosshead 34 and its regulation depending upon wave height can be better understood. Contained within the frame 75 are side slots 76 with cross pin 77 extending therethrough. On each end of cross pin 77 is attached a slot containing cap 78 having a reduced oblong inner portion 79 that may be slidable along side slot 76 and an enlarged oblong outer portion 80 that rests against the outer edges of the slots 76. Therefore, as the cross pin 77 moves back and forth, slot retaining caps 78 will hold the cross pin 77 in position.

The crosshead rod 35 extends downward through bottom slot 81 and is pivotally connected to cross pin 77. Likewise, pivotally connected to cross pin 77 is cylinder rod 82 which connects to piston 84 in hydraulic cylinder 83. Connected to each end of hydraulic cylinder 83 are solenoid valves 85 and 86 that receive pressurized hydraulic fluid from pressure tank 88 (see FIG. 1) via conduit 87. The pressure tank 88 has a pressurized gas located above hydraulic fluid contained therein to maintain pressure on the hydraulic fluid. Also connected to each end of the hydraulic cylinder 83 are solenoid valves 89 and 90 which connect to to return conduit 91 that returns hydraulic fluid to accumulator tank 92 for repressurization and injection into pressure tank 88.

If all of the solenoid valves 85, 86, 89 and 90 are closed, the piston 84 is fixed in a given location due to the incompressibility of the hydraulic fluid thereby holding the cylinder rod 82 in a fixed position. The location of the cylinder rod 82 in a fixed position also locates the interconnecting crosshead 34 and cross pin 77 in a fixed position. Referring now to FIG. 10 in conjunction with FIGS. 3 and 4, a schematic representation of the controls for solenoids 85, 86, 89 and 90 is shown. The lever arm 25 moves pivotally about pivot pin 33 in response to the float 24 (see FIG. 1).

Assume that the height of the waves has increased and that the up and down movement of the lever arm 25 has been increased. DC line voltage connects through wire 93 to a wiper strip 94 and to contact 95 of switch 96. From wiper strip 94, a rubbing contact 97 also connects to contact 98 of switch 99 through flexible connection 100. Assuming that the lever arm 25 is moved upward in response to a large wave acting against float 24 which is transmitted through lever arm 25, cam 101 will push contact 95 into electrical connection with switch contact 102. The other wire 103 for DC voltage is connected to each of the solenoid valves 85, 86, 89 and 90. By connecting electrical voltage to switch contact 102, solenoid valves 89 and 86 will open if the voltage remains for a predetermined time interval. The opening of solenoid valve 89 will allow fluid to the left of piston 84 to return to the accumulator tank 92 and the opening of solenoid valve 86 will allow pressurized fluid from pressure tank 88 to enter hydraulic cylinder 83 to the right of piston 84. The hydraulic fluid will then cause cylinder rod 82 to move to the left thereby repositioning the cross pin 77 along side slots 76.

Conversely, if the lever arm 25 drops down a predetermined distance so that cam 104 pushes contact 98 of switch 99 into electrical connection with switch contact 105, then electrical voltage is supplied to solenoid valves 85 and 90. The supplying of energy to solenoid valves 85 and 90 will result if the height of the waves is less than a predetermined amount so that lever arm 25 moves downward to move cam 104 and switch 99 to move contact 98 into an electrical connection with switch contact 105. Unless the electrical connection is maintained for a predetermined time interval, solenoid valves 85 and 90 will not be activated. By the activation of solenoid valves 85 and 90, pressurized fluid will flow through solenoid valve 85 to hydraulic cylinder 83 on the left side of piston 84. Likewise, the opening of solenoid valve 90 will allow fluid to flow from hydraulic cylinder 83 on the right side of piston 84 for return to accumulator tank 92. After a predetermined time interval, solenoid valves 85 and 90 will cut OFF after having moved piston 84 and cylinder rod 82 to the right thereby repositioning cross pin 77 of the interconnecting crosshead 34 to the right along side slots 76. By the positioning of cross pin 77 along the interconnecting crosshead 34, the vertical movement of the secondary lever 26 can be controlled between certain limits despite the vertical movement of lever arms 25. Therefore, the vertical movement of the piston rod 28 may be maintained thereby maintaining the stroke length of piston 47 in cylinder 48 (see FIG. 2).

Figure 7:
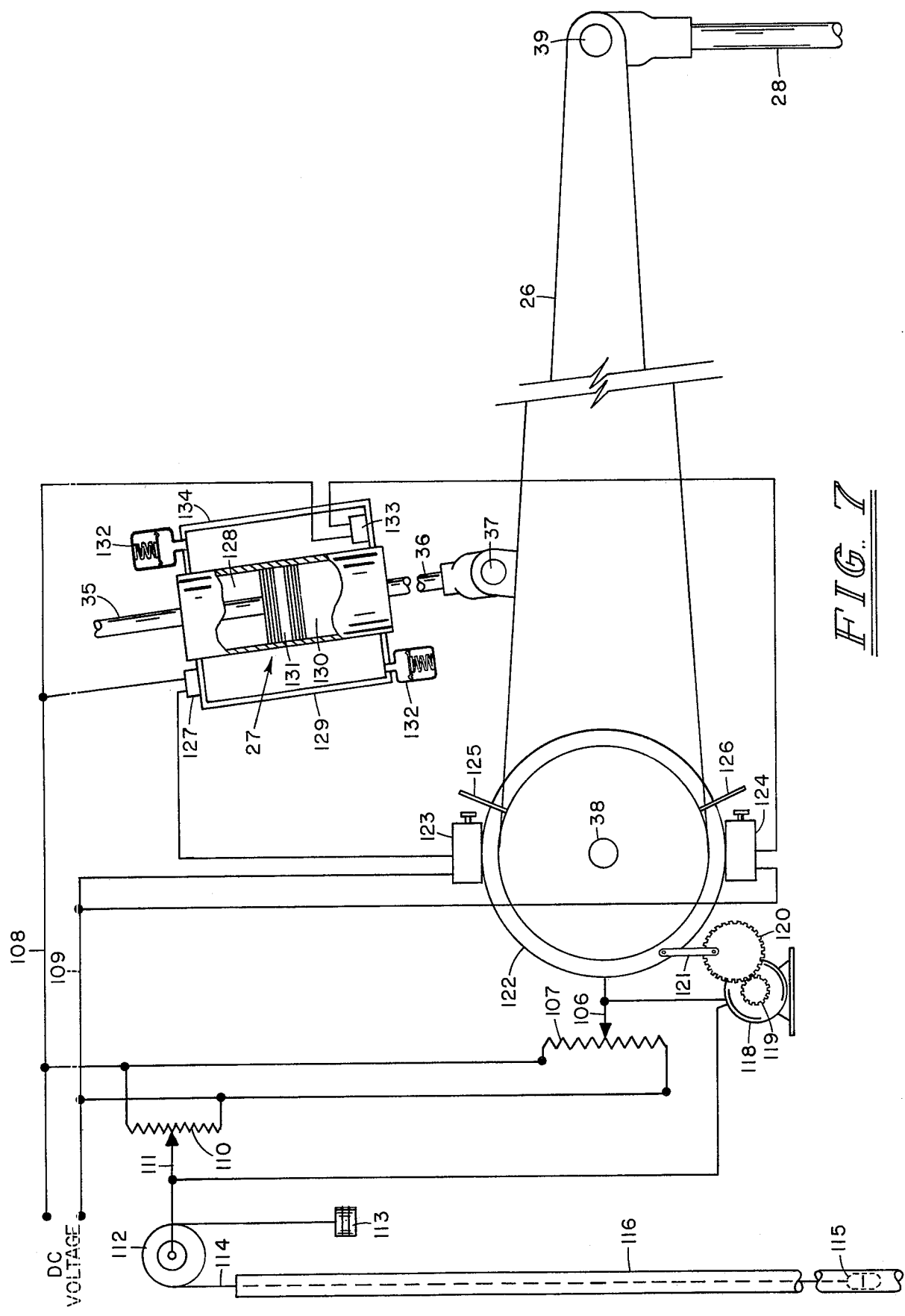
FIG. 7 is a pictorial schematic view of the control portion for adjusting the hydraulic cylinder in response to the tide.

Referring now to FIG. 7 of the drawings, a more detailed explanation of the secondary lever 26 and its operation is provided. As the secondary lever 26 pivots about pivot pin 38, it will cause the wiper arm 106 to move along resistor 107. Resistor 107 is connected across DC voltage feeding in through lines 108 and 109. Also connected across the DC voltage is resistor 110 having a wiper arm 111 operable by pulley 112. On one side of pulley 112 are located counterbalancing weights 113 that connect through cable 114 around pulley 112 to float 115. Float 115 is located inside of tube 116 which extends below the ocean surface. Due to the opening 117 (see FIG. 2) between the bottom of the tube 116, the ocean waters will be received therein. Float 115 will rest on the ocean surface contained inside of tube 116. By limiting the size of the opening 117, wave action will have very little effect on float 115. However, float 115 will rise and fall as the tide rises and falls.

Motor 118 is a servocontrol motor wherein the voltage received from wiper arm 111 of resistor 110 should equal the voltage received by wiper arm 106 of resistor 107. If there is a difference in the voltage, motor 118 will turn gear 119 which will drive a secondary gear 120 having linkage 121 with slip ring 122. Mounted on slip ring 122 are contact switches 123 and 124. Connected to secondary arm 26 are camming tabs 125 and 126. Therefore, as the variation in voltage from resistors 107 and 110 is received by motor 112, the turning of gear 119 and secondary gear 120 will cause the linkage 121 to rotate slip ring 122. Rotation of the slip ring 122 will cause either camming tab 125 to close contact switch 123, or camming tab 126 to close contact switch 124.

The closing of contact switch 123 will open solenoid valve 127. The opening of solenoid valve 127 allows fluid in the upper chamber 128 of hydraulic cylinder 127 to flow through conduit 129 to the lower chamber 130 below piston 131. The movement of hydraulic fluid from upper chamber 128 to lower chamber 130 repositions the piston 132 upward thereby increasing the distance between pin 37 and cross pin 77 of interecting crosshead 34. When secondary lever 26 has been repositioned so that camming tab 125 no longer closes contact switch 123, solenoid valve 127 will close. Accumulator 132 will allow for normal expansion or contraction of the hydraulic fluid, plus account for any volume increase due to movement of the crosshead rod 35 from upper chamber 128. Likewise, if secondary lever 26 moves downward so that camming tab 126 closes contact switch 124, solenoid valve 133 will be open thereby allowing fluid flow from lower chamber 130 to upper chamber 128 through conduit 134. The flow of fluid from the lower chamber 130 to the upper chamber 128 will cause the piston 131 to move downward thereby shortening the distance between pin 37 and cross pin 77 of intersecting crosshead 34. Again, the normal expansion of fluid may be accomodated by accumulator 132, as well as the decrease in volume caused by the movement of crosshead rod 35 from the upper chamber 128. Movement of the piston 131 will allow the secondary arm 26 to move upward until camming tab 126 releases contact switch 124 to deenergize solenoid 133. Therefore, by use of the float 115 and the servocontrol motor 118 as just described, the distance between pin 37 on secondary arm 26 and cross pin 77 on lever arm 25 may be varied in response to the tide. By such variation, the stroke length of the piston 47 is maintained essentially constant even though the tide may vary. The solenoid valves 133 and 127 may incorporate check valves herein to prevent reverse leakage.

Referring now to FIGS. 5 and 6 in combination, positioning of the float 24 will be explained in more detail. The vertical shaft 29 has a gear 135 located thereon that is intermeshed with pinion gear 136. The pinion gear 136 is operated by hydraulic cylinder 137 and piston 138 located therein. Solenoid valves 139 and 140 connect to left chamber 141 and right chamber 142, respectively, through conduit 143 to the pressure tank 88 (see FIG. 1). Solenoid valves 144 and 145 likewise connect left chamber 141 and right chamber 142 through conduit 146 to the accumulator tank 92 (see FIG. 1).

Referring specifically to FIG. 6 in combination with FIG. 5, the weather vane 147 (also shown in FIGS. 1 and 2) controls the movement of wiper arm 148 of resistor 149. Electrical connections from resistor 149 extend to float control 30 located on the top of horizontal lever 31. Inside of float control 30 is located a servomotor 151 that is connected through gears 152 and 153 to a slip ring 154 pivotally attached to a vertical shaft 29. Located on control plate 154 is resistor 155 having a wiper arm 156 that connects to DC voltage which is also applied across resistor 149. If the voltage from the respective wiper arm 148 or 156 is different, the servomotor 151 will turn gear 152 which will in turn rotate slip ring 154.

To provide a positive positioning of the float 24 that is locked into position, vertical shaft 29 has a pair of camming tabs 157 and 158 for operating contact switches 159 and 160, respectively, mounted on slip ring 154. The rotation of slip ring 154 so that camming tab 157 closes contact switch 159 will energize solenoid valves 139 and 140 to cause the piston 138 to move to the right thereby rotating the float 24 and vertical shaft 59 through gear 135 and pinion gear 136. Once the float 24 has been rotated, the vertical shaft 59 and camming tab 157 will likewise be positively rotated thereby opening contact switch 159. Conversely, if slip ring 154 rotates in the opposite direction, camming tab 158 will close contact switch 160 thereby opening solenoid valves 144 and 145 to cause the piston 138 to move to the left thereby causing float 24 and vertical shaft 29 to pivot in the opposite direction via gear 135 and pinion gear 136. By positioning the float 24 so that its longitudinal axis is perpendicular to the direction of travel of the wave front, the maximum force of the waves against the float 24 is felt.

While it is not explained in detail herein, the horizontal lever 31 of lever arm 25 may be pivotally connected through pin 162 to maintain the vertical shaft 29 in the vertical position to receive the maximum effectiveness from the waves against float 24. A hydraulic cylinder 163 and a connecting rod 164 may be used in the manner as the previously described hydraulic cylinders to rigidly connect the horizontal lever 31 to the lever arm 25 except for periodic adjustments as may be necessary due to the tide.

As can be seen in FIG. 1, every other float 24 is staggered with respect to the adjacent floats so that maximum effectiveness of the waves against the floats can be obtained.

Figure 11:
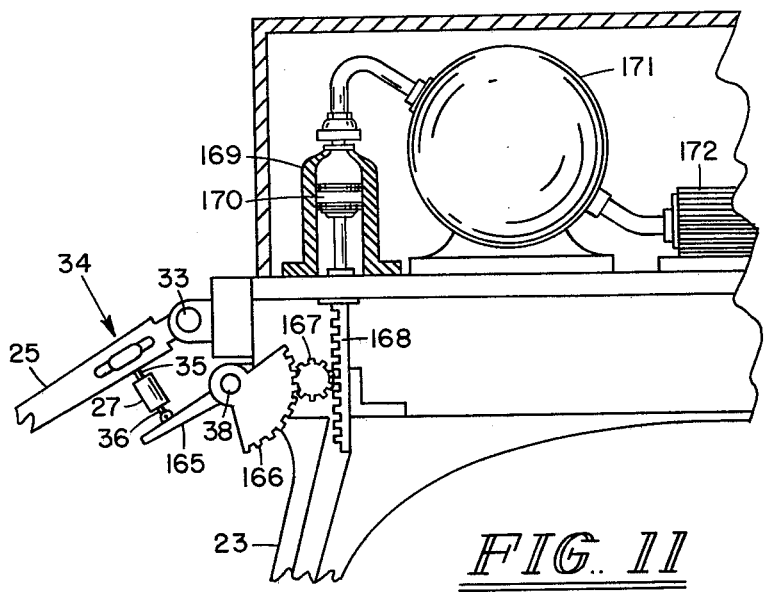
FIG. 11 is an alternative embodiment of the present invention.

Referring now to FIG. 11, there is shown an alternative embodiment wherein the action of the lever arm 25 is transmitted through the interconnecting crosshead 34, crosshead rod 35, hydraulic cylinder 27 and cylinder shaft 36 to secondary lever 165. The up and down motion of the secondary lever 165 operates a radial gear 166 about pin 38 to turn stationary gear 167. The rotation of stationary gear 167 moves pinion gear 168 which operates pneumatic cylinder 169 and piston 170 located therein. Operation of piston 170 will pressurize a gas, such as the atmosphere, which is then stored in an accumulation tank 171. The pressurized gas stored in accumulation tank 171 is then used to turn turbine 172 for operating a generator in a manner similar to the turbine 71 turning the generator 74. All of the equipment as shown in the alternative embodiment of FIG. 11 may be located on the plant structure 23 above the sea level.

I claim:

1. A hydroelectric plant for generating energy from wave action of a body of water comprising:
   plant structure located in the body of water;
   first lever means pivotally connected at a first end to and extending downward from said plant structure to a surface of said body of water;
   float means attached to a second end of said first lever means for floating on said surface;
   second lever means pivotally connected to said plant structure;
   crosshead means pivotally connecting said first lever means to said second lever means;
   cylinder means operatively connected to said second lever means to move a piston means therein in response to said wave action against said float means, said piston means reciprocating in said cylinder means to move a fluid therethrough;
   first control means for generating a first control signal in response to height of said wave action, said first control signal adjusting said crosshead means to maintain relatively constant stroke length of said piston means regardless of said height;
   means for generating power from said fluid movement from said piston means.

2. The hydroelectric plant as recited in claim 1 further including second control means for generating a second control signal in response to tide movement, said second control signal changing lengths of a connecting means pivotally attached on opposite ends thereof to said first and second lever means, said connecting means maintaining said stroke length regardless of said tide movements.

3. The hydroelectric plant as recited in claim 2 further including third control means for generating a third control signal in response to changes in direction of said wave action, said third control signal rotating said float means and connecting shaft means to maintain said float means perpendicular to direction of movement of said wave action.

4. The hydroelectric plant as recited in claim 3 wherein said third control signal operates third servo means to rotate said float means, said control signal being provided by weather vane means.

5. The hydroelectric plant as recited in claim 4 further including means for adjusting said shaft means to maintain said shaft means approximately perpendicular to said surface regardless of said tide movements.

6. The hydroelectric plant as recited in claim 2 wherein said first control signal operates first hydraulic cylinder means to reposition said crosshead means in response to changes in said height of said wave action.

7. The hydroelectric plant as recited in claim 6 wherein said second control means includes an isolated float moving in response to said tide movements to rotate pulley means, said pulley means generating said second control signal which operates second servo means to change lengths of said connecting means.

8. The hydroelectric plant as recited in claim 7 further includes second hydraulic cylinder means operated by said second servo means to change lengths of said connecting means, said hydraulic cylinder means forming a part of said connecting means.

9. The hydroelectric plant as recited in claim 2 wherein said cylinder means is located below said surface and said fluid is water, said piston means having check valve means therein for said fluid movement therethrough.

10. The hydroelectic plant as recited in claim 2 wherein said fluid is air, said piston means pressurizing said air and moving said pressurized air to storage means, said pressurized air in said storage means operating said generating means.

* * * * *